Sept. 5, 1944.　　　　J. A. REAVELL　　　　2,357,286
METHOD OF AND MEANS FOR EFFECTING THE
EVAPORATION OF WATER AND THE LIKE
Filed Sept. 19, 1942
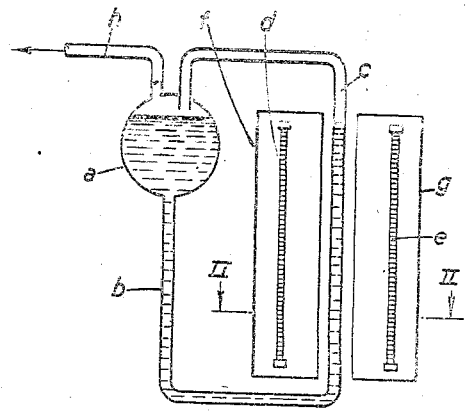
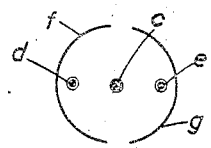
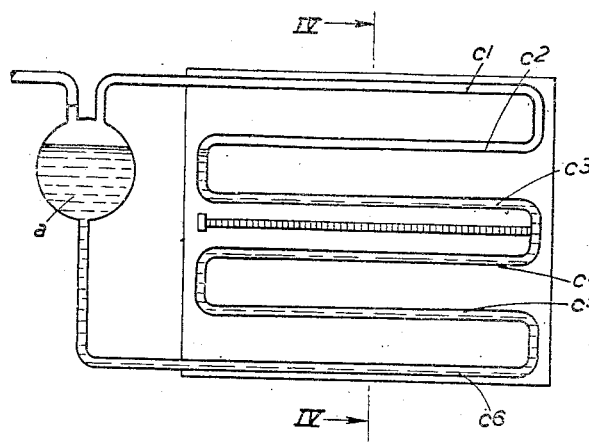
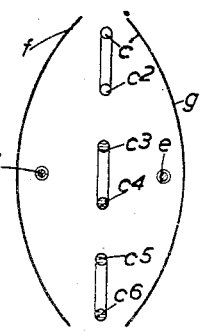
INVENTOR
James Arthur Reavell
BY
John E. Eastlack
ATTORNEY Patented Sept. 5, 1944

2,357,286

UNITED STATES PATENT OFFICE 2,357,286

METHOD OF AND MEANS FOR EFFECTING THE EVAPORATION OF WATER AND THE LIKE

James Arthur Reavell, London, England

Application September 19, 1942, Serial No. 459,020
In Great Britain September 23, 1941

12 Claims. (Cl. 219—45)

This invention relates to methods of and means for effecting the evaporation of water or solvents from liquids in bulk as solutions or suspensions.

In order to effect evaporation, some form of heat is usually necessary and, in most instances, the heat is supplied by steam, hot air or electric heating means delivered to or associated with the vessel or apparatus in which the evaporation is to be effected. With many such heating systems it is not possible to transmit or convey the heat to the body of the liquid or solid under treatment in a direct manner or without first passing through an intermediate stage of heat transmission. For example, with steam or external electric heating, the heat must first pass through the walls of the container which absorbs the heat and then passes it on to the liquid or solid material disposed within the container with the result that the liquid or solid under treatment is subjected to a relatively high contact temperature.

The effect of a relatively high contact temperature is to render impossible the successful evaporation in evaporating vessels that absorb and pass on the heat, of liquors of the kind that are particularly sensitive to heat. For example, blood, blood sera and blood plasma for medical purposes, solutions of vitamins and enzymes such as diastase or rennet or other biologically active liquids cannot be evaporated in apparatus where the heat passes through an intermediate stage of heat transmission through the wall of the evaporating vessel because of the relatively high contact temperature.

The chief object of the present invention is to provide an improved method of and means for effecting evaporating and like operations of heat sensitive liquids in bulk wherein use is made of electro-magnetic radiation.

According to the invention there is provided a method of heating liquids of the kind referred to to evaporation other than basically by convection or conduction which consists in placing the liquid to be heated in a container the wall or walls of which is or are composed wholly or in part of a poor heat-conducting material which is translucent to infra-red rays and locating in proximity to the external surface of said wall or walls one or more infra-red ray generators emitting rays of a wave length falling within the 10,000 to 50,000 Angstrom band.

By "infra-red ray generator" is meant one which is specifically designed to emit infra-red rays and not one which fortuitously emits some and a minority of infra-red rays while at the same time generating and emitting other form or forms of heat energy. In practice the following forms of generators may be used: For example, for wavelengths of from 10,000 to 14,000 units, the well-known forms of infra-red ray generators consisting of one or more electrically heated filament lamps having filaments composed, e. g. of tungsten or carbon may be used. Such filaments normally operate at temperatures of from 2000 to 2700° C. but by operating the lamps at lower temperatures such as 1500° C., infra-red radiation up to 20,000 units may, if necessary, be obtained. For wavelengths falling between 20,000 and 50,000 Angstrom units there may be used known generators designed for infra-red radiation comprising electrically heated elements in the form of rods or tubes of ceramic or like material having wound thereon a wire resistance which may be of the type sold commercially under the registered trade-mark "Nichrome" or which, for high temperature operations, may be of platinum. Such generators are operated at temperatures of between 300 and 1100° C.

For the container or the translucent wall thereof, various materials may be used. For example, for wavelengths falling within the band of 10,000 to 30,000 units, plate glass may be used and if suitably thin will transmit 50% to 60% of the longer waves and more than 90% of the shorter waves. Quartz or fused silica has, however, a better transmission and may be used in instances in which a wave band of from 10,000 to 30,000 units is to be used. Such materials if suitably thin will transmit 50% of the longer waves. For transmissions up to 50,000 Angstrom units, certain forms of glass such as that described in British Patent Specification No. 496,508, may be used and will transmit 60% of the long waves and 83% of waves not exceeding 45,000 units.

It has been found that particular advantages are obtainable by the utilisation of the above mentioned sections of the infra-red spectrum for the purpose in view. For example, the requisite amount of heat in terms of heat units can readily be obtained with simple apparatus and with a minimum expenditure of primary electrical energy and the radiation obtained can be readily controlled and distributed and is, moreover, such that it will pass almost entirely through suitable material which is translucent to infra-red rays. In some instances, it is desirable to use only that section of the infra-red spectrum bounded by wave lengths of 20,000 and 50,000 Angstrom units whilst in other instances a narrower band of from 25,000 to 50,000 or from 40,000 to 50,000 units is preferable.

In carrying the invention into effect, the radiant energy may be directed, controlled or concentrated by the use of one or more suitable reflectors arranged in juxtaposition to the liquid container.

In order that the said invention may be clearly understood and readily carried into effect, the same will now be more fully described with reference to the accompany drawing, in which:

Fig. 1 illustrates diagrammatically and in elevation one mode of carrying the invention into effect;

Fig. 2 is a section on the line II—II of Fig. 1;

Fig. 3 illustrates diagrammatically an alternative arrangement; and

Fig. 4 is a section on the line IV—IV of Fig. 3.

In the form of the invention shown diagrammatically in Figs. 1 and 2 of the accompanying drawing, the liquid to be evaporated is contained in a vessel $a$ of any convenient form having associated therewith a circulating system made up of a tube $b$ depending from the lower part of the vessel $a$ and connected at its lower end with the lower end of a vertical or substantially vertical tube $c$ which, in turn, has the upper part thereof connected with the upper part of the aforesaid vessel. The vertical tube $c$ is adapted to constitute the aforesaid container the contents of which are to be heated by waves of radiant energy in the form of infra-red rays falling within that section of the infra-red spectrum chosen or selected for the carrying out of the process.

It is to be understood that the infra-red ray generator employed is one which is specifically designed to emit infra-red rays and not one which fortuitously emits some and a minority of infra-red rays while at the same time generating and emitting other form or forms of heat energy, the radiant energy being directed, controlled or concentrated by the use of one or more ellipsoidal or parabolic reflectors arranged in juxtaposition to the liquid. For example, as is shown in Figs. 1 and 2, two such sources may be provided as indicated at $d$ and $e$ so that they are disposed at opposite sides of the tube $c$, and two reflectors $f$ and $g$ may be used and arranged opposite each other with the tube $c$ interposed between and lying adjacent the open ends of the said reflectors. Alternatively, three or more reflectors may be disposed around the said container.

It will be appreciated that by disposing the reflectors around or at opposite sides of the container, the heating effect of the rays may be utilised to greatest advantage since any rays passing the container when first reflected will in all probability, be caused to heat the liquid upon being reflected again by the opposite reflector.

In regard to the form of the generator employed in any given case, this will depend among other things upon the wave length to be used. It will also depend upon the required number of heat units to be supplied. Generators for infra-red radiation have been used for 40 or 50 years and although they have usually been electrically heated, the theory of radiant heat-transmission does not restrict to any single form of heating as it requires only the maintenance of a specific temperature. In practice, the following forms of generators may be used: For example, for wavelengths of from 10,000 to 14,000 units, the well-known forms of infra-red ray generators consisting of one or more electrically heated filament lamps having filaments composed, e. g. of tungsten or carbon may be used. Such filaments normally operate at temperatures of from 2000 to 2700° C. but by operating the lamps at lower temperatures such as 1500° C., infra-red radiation up to 20,000 units may, if necessary, be obtained. For wavelengths falling between 20,000 and 50,000 Angstrom units there may be used known generators designed for infra-red radiation comprising electrically heated elements in the form of rods or tubes of ceramic or like material having wound thereon a resistance wire which may be of the type sold commercially under the registered trade-mark "Nichrome" or which, for high temperature operations, may be of platinum. Such generators are operated at temperatures of between 300 and 1100° C.

For the tube $c$ or the translucent wall thereof, various materials may be used. For example, for wavelengths falling within the band of 10,000 to 30,000 units, plate glass may be used and if suitably thin will transmit 50% to 60% of the longer waves and more than 90% of the shorter waves. Quartz or fused silica has, however, a better transmission and may be used in instances in which a wave band of from 10,000 to 30,000 units is to be used. Such materials if suitably thin will transmit 50% of the longer waves. For transmissions up to 50,000 Angstrom units, certain forms of glass such as that described in British Patent Specification No. 496,508 may be used and will transmit 60% of the long waves and 83% of waves not exceeding 45,000 units.

The upper portion of the vessel $a$ is preferably provided with a conduit $h$ affording communication between the space above the liquid in the vessel and a source of vacuum or reduced pressure and it will be appreciated that in an arrangement with the tube $c$ disposed vertically as shown, the well known "Kestner" climbing-film effect may be obtained so that the liquid is caused to travel upwardly through the tube $c$ in the form of a thin film or layer in contact with the inner peripheral surface of the tube thereby considerably facilitating heating of the liquid by the infra-red rays.

It is not essential, however, that the aforesaid container should be disposed vertically and, in Figs. 3 and 4 of the accompanying drawing, there is shown an alternative mode of carrying out the invention in which the liquid is subjected to the action of the infra-red rays whilst passing through a tube or conduit made up of interconnected horizontally or substantially horizontally disposed portions such as the portions $c^1$, $c^2$, $c^3$, $c^4$, $c^5$, and $c^6$, so that the liquid being heated is caused to traverse a zig-zag or sinuous path, the tubes or conduits $c^1$ and $c^6$ being connected respectively with the upper and lower parts of a vessel $a$ as above described so as to provide a circulatory system.

In carrying out the invention, it is desirable that the heat absorption by the container walls should be kept to a minimum. Consequently, if desired, means may be provided for cooling the walls of the container as, for example, by directing a cooling current of air thereagainst, for which purpose, a fan may, in some instances, be provided beneath the liquid container or in any other convenient position.

I claim:

1. A method of heating heat sensitive liquids in bulk to evaporation other than basically by convection or conduction which consists in placing the liquid to be heated in a container a wall of which is composed of a poor heat-conducting material which is translucent to infra-red rays and locating in proximity to the external surface of said wall at least one infra-red ray generator emitting rays of a wavelength falling within the 10,000 to 50,000 Angstrom band, the material of the container being chosen to suit the infra-red ray generator employed.

2. A method of heating heat sensitive liquids in bulk to evaporation other than basically by convection or conduction which consists in placing the liquid to be heated in a container a wall of which is composed of a poor heat-conducting material which is translucent to infra-red rays and locating in proximity to the external surface of said wall at least one infra-red ray generator emitting rays of a wavelength falling within the 20,000 to 50,000 Angstrom band, the material of the container being chosen to suit the infra-red ray generator employed.

3. A method of heating heat sensitive liquids in bulk to evaporation other than basically by convection or conduction which consists in placing the liquid to be heated in a container a wall of which is composed of a poor heat-conducting material which is translucent to infra-red rays and locating in proximity to the external surface of said wall at least one infra-red ray generator emitting rays of a wavelength falling within the 25,000 to 50,000 Angstrom band, the material of the container being chosen to suit the infra-red ray generator employed.

4. A method of heating heat sensitive liquids in bulk to evaporation other than basically by convection or conduction which consists in placing the liquid to be heated in a container a wall of which is composed of a poor heat-conducting material which is translucent to infra-red rays and locating in proximity to the external surface of said wall at least one infra-red ray generator emitting rays of a wavelength falling within the 40,000 to 50,000 Angstrom band, the material of the container being chosen to suit the infra-red ray generator employed.

5. Means for effecting the evaporation of heat sensitive liquids in bulk wherein heat is supplied to the liquid contained in a container composed of a material which is translucent to infra-red rays and does not, of itself, readily absorb heat, by the aid of radiant energy in the form of infra-red rays derived from at least one infra-red ray generator and in waves falling substantially within that section of the infra-red ray spectrum bounded by the wavelengths of 10,000 and 50,000 Angstrom units, the radiant energy being concentrated by the use of at least one reflector arranged in juxtaposition to the liquid container.

6. Means for effecting the evaporation of heat sensitive liquids in bulk wherein heat is supplied to the liquid being passed through a tubular member composed of a material which is translucent to infra-red rays and does not, of itself, readily absorb heat, by the aid of radiant energy in the form of infra-red rays derived from at least one infra-red ray generator and in waves falling substantially within that section of the infra-red spectrum bounded by the wavelengths of 10,000 and 50,000 Angstrom units, the radiant energy being concentrated by the use of at least one reflector arranged in juxtaposition to the said tubular member.

7. Means for effecting the evaporation of heat sensitive liquids wherein heat is supplied to the liquid while the latter is passing through a tubular member as a thin film in contact with the inner surface of the tubular member, by the aid of radiant energy in the form of infra-red rays derived from at least one infra-red generator and in waves falling substantially within that section of the infra-red spectrum bounded by the wavelengths of 10,000 and 50,000 Angstrom units, the radiant energy being concentrated by the use of at least one reflector arranged in juxtaposition to the tubular member, said tubular member being composed of a material which is translucent to infra-red rays and does not, of itself, readily absorb heat, and said material being chosen to suit the infra-red ray generator employed.

8. Means for effecting the evaporation of heat sensitive liquids in bulk wherein heat is supplied to the liquid while the latter is being passed through a vertically disposed tubular member, by the aid of radiant energy in the form of infra-red rays derived from at least one infra-red ray generator and in waves falling substantially within that section of the infra-red spectrum bounded by the wavelengths of 10,000 and 50,000 Angstrom units, the radiant energy being concentrated by the use of at least one reflector arranged in juxtaposition to the tubular member, said tubular member being composed of a material which is translucent to infra-red rays and does not, of itself, readily absorb heat, and said material being chosen to suit the infra-red generator employed.

9. Means for effecting the evaporation of heat sensitive liquids in bulk wherein heat is supplied to the liquid while the latter is being passed through a sinuous tubular member, by the aid of radiant energy in the form of infra-red rays derived from at least one infra-red ray generator and in waves falling substantially within that section of the infra-red spectrum bounded by the wavelengths of 10,000 and 50,000 Angstrom units, the radiant energy being concentrated by the use of at least one reflector arranged in juxtaposition to the tubular member, said tubular member being composed of a material which is translucent to infra-red rays and does not, of itself, readily absorb heat, and said material being chosen to suit the infra-red ray generator employed.

10. Means for effecting the evaporation of heat sensitive liquids in bulk wherein heat is supplied to the liquid contained in a container composed of a material which is translucent to infra-red rays and does not, of itself, readily absorb heat, by the aid of radiant energy in the form of infra-red rays derived from at least one infra-red ray generator and in waves falling substantially within that section of the infra-red spectrum bounded by the wavelengths of 10,000 and 50,000 Angstrom units, the radiant energy being concentrated by the use of at least one reflector arranged in juxtaposition to the liquid container and means being provided for cooling the wall of the container.

11. Means for effecting the evaporation of heat sensitive liquids in bulk wherein heat is supplied to the liquid being passed through a tubular member composed of a material which is translucent to infra-red rays and does not, of itself, readily absorb heat, by the aid of radiant energy in the form of infra-red rays derived from at least one infra-red ray generator and in waves falling substantially within that section of the infra-red spectrum bounded by the wavelengths of 10,000 and 50,000 Angstrom units, the radiant energy being concentrated by the use of at least one reflector arranged in juxtaposition to the said tubular member and means being provided for cooling the wall of the tubular member.

12. Means for effecting the evaporation of heat sensitive liquids in bulk wherein heat is supplied to the liquid contained in a container composed of a material which is translucent to infra-red rays and does not, of itself, readily absorb heat, by the aid of radiant energy in the form of infra-red rays derived from at least one infra-red ray generator and in waves falling substantially within that section of the infra-red spectrum bounded by the wavelengths of 10,000 and 50,000 Angstrom units, the radiant energy being concentrated by at least two reflectors disposed around said container.

JAMES ARTHUR REAVELL.